(12) United States Patent
Choi et al.

(10) Patent No.: US 12,504,500 B2
(45) Date of Patent: Dec. 23, 2025

(54) METHOD AND APPARATUS FOR SMART ANCHOR-BASED POSITION ESTIMATION

(71) Applicants: HYUNDAI MOTOR COMPANY, Seoul (KR); KIA CORPORATION, Seoul (KR)

(72) Inventors: Jung Hun Choi, Hwaseong-si (KR); Dong Hyun Ha, Seoul (KR); Jae Wung Jung, Bucheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 406 days.

(21) Appl. No.: 18/110,481

(22) Filed: Feb. 16, 2023

(65) Prior Publication Data
US 2024/0094328 A1    Mar. 21, 2024

(30) Foreign Application Priority Data
Sep. 16, 2022    (KR) .................. 10-2022-0116939

(51) Int. Cl.
*G01S 5/14*    (2006.01)
*G01S 5/02*    (2010.01)

(52) U.S. Cl.
CPC ............ *G01S 5/145* (2013.01); *G01S 5/0218* (2020.05); *G01S 5/0242* (2013.01); *G01S 2205/01* (2020.05)

(58) Field of Classification Search
CPC .......... G01S 5/14; G01S 5/145; G01S 5/0218; G01S 5/0242; G01S 5/0284; G01S 2205/01; G01S 5/0249
See application file for complete search history.

(56) References Cited

U.S. PATENT DOCUMENTS

| | | | |
|---|---|---|---|
| 11,827,178 B2 * | 11/2023 | Baek | H02B 1/26 |
| 2008/0032709 A1 * | 2/2008 | Guvenc | G01S 5/14 |
| | | | 455/456.2 |
| 2021/0235410 A1 * | 7/2021 | Hollar | H04W 4/80 |
| 2022/0099816 A1 * | 3/2022 | Eber | G01S 11/02 |
| 2022/0381870 A1 * | 12/2022 | Sundaresan | G01S 5/011 |
| 2024/0272292 A1 * | 8/2024 | Chen | G01S 5/02213 |

\* cited by examiner

*Primary Examiner* — Cassi J Galt
(74) *Attorney, Agent, or Firm* — Lempia Summerfield Katz LLC

(57) ABSTRACT

A smart anchor-based position estimation method and apparatus are disclosed. The position estimation method, performed by a position estimation apparatus, includes: identifying one or more line-of-sight (LOS) anchors from among one or more anchors mounted in a vehicle; selecting reference anchors from among the one or more LOS anchors; and estimating a position of a tag based on a number of the reference anchors. The reference anchors are selected based on a rate of formation of an ultra-wideband (UWB) link to the tag and accuracy of the estimated position of the tag.

16 Claims, 11 Drawing Sheets

METHOD AND APPARATUS FOR SMART ANCHOR-BASED POSITION ESTIMATION

CROSS-REFERENCE TO RELATED APPLICATION

The present application is based on and claims the benefit of priority to Korean Patent Application Number 10-2022-0116939, filed on Sep. 16, 2022 in the Korean Intellectual Property Office, the entire disclosure of which is incorporated herein by reference.

TECHNICAL FIELD

The present disclosure relates to a smart anchor-based position estimation method and apparatus. More specifically, the present disclosure relates to a position estimation method and an apparatus for estimating a position of a dynamic object using ultra-wideband (UWB) anchors mounted in a vehicle.

BACKGROUND

The content described below merely provides background information related to the present embodiment and does not constitute the related art.

Ultra-Wideband (UWB) technology is a near field wireless communication protocol that operates over radio waves at high frequencies. The UWB technology is a radio technology in which a frequency band of 500 MHz or more is used, or a numerical value defined as a fractional bandwidth is 25% or more. The fractional bandwidth means a bandwidth of a signal with respect to a center frequency. In other words, UWB is a radio technology in which a broadband frequency is used and has various advantages, such as high distance resolution, transparency, strong immunity to narrowband noise, and coexistence with other devices that share frequencies. The UWB technology is characterized by very precise spatial recognition and directionality. Mobile devices work to accurately perceive a surrounding environment. Various devices are connected through UWB, so that various functions from secure remote payment to locating a remote control can be performed. Further, since an accurate search can be performed in a large area through UWB, an exact position of a restaurant or car can be ascertained using a smartphone.

In an autonomous vehicle and a conventional vehicle, it is important to ascertain exact positions of the vehicle and an object around the vehicle. Since a GPS-based positioning technology has an average error of 2-5 meters (m) in positioning accuracy, the average error is beyond a minimum positioning error range required for autonomous driving, which is within about 30 cm. Thus, it is necessary to ascertain an exact position of a vehicle and an object around the vehicle using the UWB technology.

SUMMARY

According to the present disclosure, a position estimation method performed by a position estimation apparatus includes: identifying one or more line-of-sight (LOS) anchors from among one or more anchors mounted in a vehicle; selecting reference anchors from among the one or more LOS anchors; and estimating a position of a tag based on a number of the reference anchors. The reference anchors are selected based on a rate of formation of an ultra-wideband (UWB) link to the tag and accuracy of the estimated position of the tag.

According to the present disclosure, a position estimation apparatus includes a memory and a plurality of processors. At least one of the plurality of processors identifies one or more LOS anchors from among one or more anchors mounted in a vehicle, selects reference anchors from among the one or more LOS anchors, and estimates a position of a tag based on a number of the reference anchors. The reference anchors are selected based on a rate of formation of a UWB link to the tag and accuracy of the estimated position of the tag.

DETAILED DESCRIPTION

Figure 1:
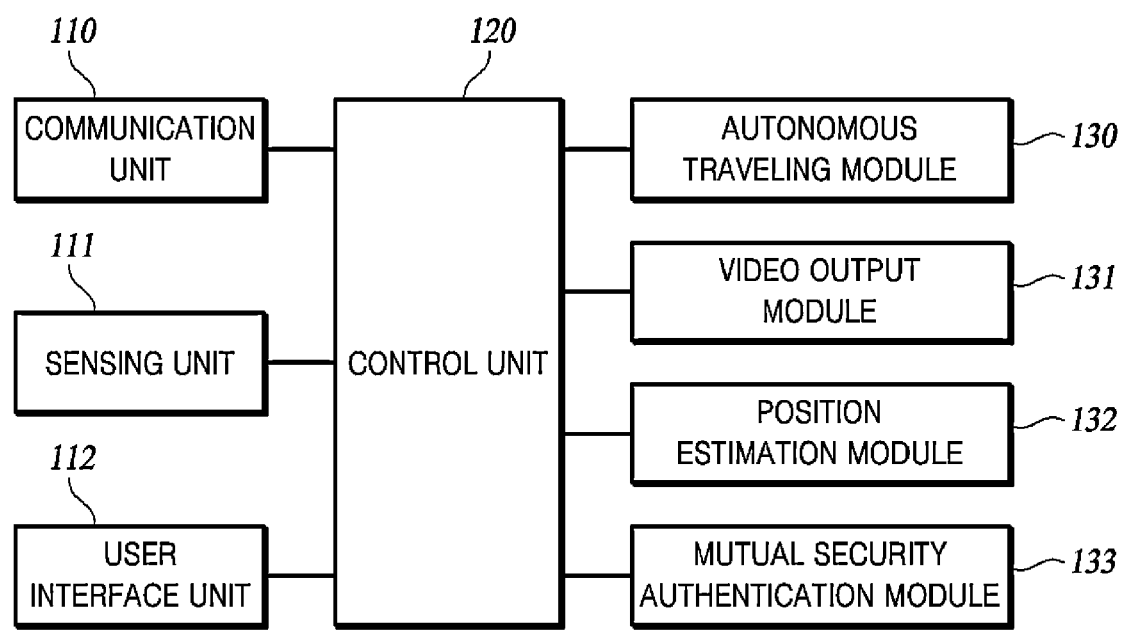
FIG. 1 is a diagram illustrating a control device mounted in a vehicle according to an embodiment of the present disclosure.

An object of the present disclosure is to provide a method and an apparatus for estimating a position of an object using three anchors.

Another object of the present disclosure is to provide a method and an apparatus for estimating a position of an object using one anchor.

Yet another object of the present disclosure is to provide a method and an apparatus for improving a link formation rate using one anchor.

Yet another object of the present disclosure is to provide a method and an apparatus for classifying anchors into line-of-sight (LOS) anchors and non-line-of sight (NLOS) anchors.

The problems to be solved by the present disclosure are not limited to the problems described above. Other problems not described should be clearly understood by those having ordinary skill in the art from the following description. Hereinafter, some embodiments of the present disclosure are described in detail with reference to the accompanying drawings. In the following description, like reference numerals designate like elements, although the elements are shown in different drawings. Further, in the following description of some embodiments, a detailed description of known functions and configurations incorporated therein has been omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude other components unless specifically stated to the contrary. The terms such as 'unit', 'module', and the like refer to one or more units for processing at least one function or operation, which may be implemented by hardware, software, or a combination thereof. When the unit, module, element, or the like of the present disclosure is described as having a purpose or performing an operation, function, or the like, the unit, module, or element should be considered herein as being "configured to" meet that purpose or to perform that operation or function.

The following detailed description, together with the accompanying drawings, is intended to describe embodiments of the present disclosure and is not intended to represent the only embodiments in which the present disclosure may be practiced.

FIG. 1 is a diagram illustrating a control device mounted in a vehicle according to an embodiment of the present disclosure.

Referring to FIG. 1, each autonomous vehicle may include a communication unit 110, a sensing unit 111, a user interface unit 112, a control unit 120, an autonomous traveling module 130, a video output module 131, a position estimation module 132, and a mutual security authentication module 133. The communication unit 110 may transmit or receive information between autonomous vehicles and between an autonomous vehicle and another object over a communication network. The communication unit 110 may transmit or receive information between autonomous vehicles and between an autonomous vehicle and another object through at least one communication scheme among a LAN (Wireless LAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), and LTE-A (Long Term Evolution-Advanced).

Further, the communication unit 110 may perform near field communication between autonomous vehicles and between an autonomous vehicle and another object. Since autonomous vehicles travel while maintaining a short distance between the autonomous vehicles, the communication unit 110 may transmit and receive information between the autonomous vehicles and between the autonomous vehicle and the other object through near field wireless communication. In this case, the communication unit 110 allows various types of information to be transmitted and received between autonomous vehicles and between an autonomous vehicle and another object. The information can be transmitted and received through Bluetooth, RFID (Radio Frequency Identification), infrared data communication (IrDA), UWB (Ultra WideBand), ZigBee, NFC (Near Field Communication), Wi-Fi (Wireless-Fidelity), Wi-Fi Direct, Wireless USB (Wireless Universal Serial Bus), or the like.

The sensing unit 111 may include a radar, a camera, a lidar, and the like. The sensing unit 111 may sense a speed and a position of a nearby autonomous vehicle and a speed and a position of a nearby object. The sensing unit 111 may detect any objects, including obstacles, people, animals, tollgates, breakwaters, and the like, in addition to autonomous vehicles. The user interface unit 112 may provide a user interface to a driver. The user interface unit 112 may receive information from the driver and input the information to the control unit 120 or output a result according to an operation. For example, the driver may input information on the nearby autonomous vehicle and information on the nearby object to the user interface unit 112. The user interface unit 112 may input the information on the nearby autonomous vehicle and the information on the nearby object to the control unit 120. The control unit 120 may issue a control command to the autonomous traveling module 130 by using the information on the nearby autonomous vehicle and the information on the nearby object.

The control unit 120 may control the autonomous traveling module 130, the video output module 131, the position estimation module 132, and the mutual security authentication module 133 according to the information received from the communication unit 110, the sensing unit 111, and the user interface unit 112. The control unit 120 may include a trained learning model. The learning model may correspond to a deep learning-based model or a support vector machine model. The control unit 120 may further include a learning unit (not illustrated) for training the learning model in advance. The learning unit can train the learning model in advance using supervised learning, unsupervised learning, semi-supervised learning, and/or reinforcement learning. Here, a specific method by which the learning unit trains the learning model based on learning data is common in a relevant field, and thus a detailed description thereof has been omitted.

The autonomous traveling module 130 may change or maintain a speed, direction, or the like of the vehicle according to a control command of the control unit 120. The video output module 131 may output an image of a nearby vehicle, a nearby obstacle, a nearby building, and the like to the driver according to the control command of the control unit 120. The position estimation module 132 may estimate a position of the nearby object by using a trilateration technique according to a control command from the control unit 120. The mutual security authentication module 133 may perform authentication using an identifier (ID) between nearby vehicles and between nearby objects according to a control command of the control unit 120. Such authentication may be performed via a UWB. Autonomous vehicles can defend against a spoofing attack of an attacker through such authentication.

Figure 2:
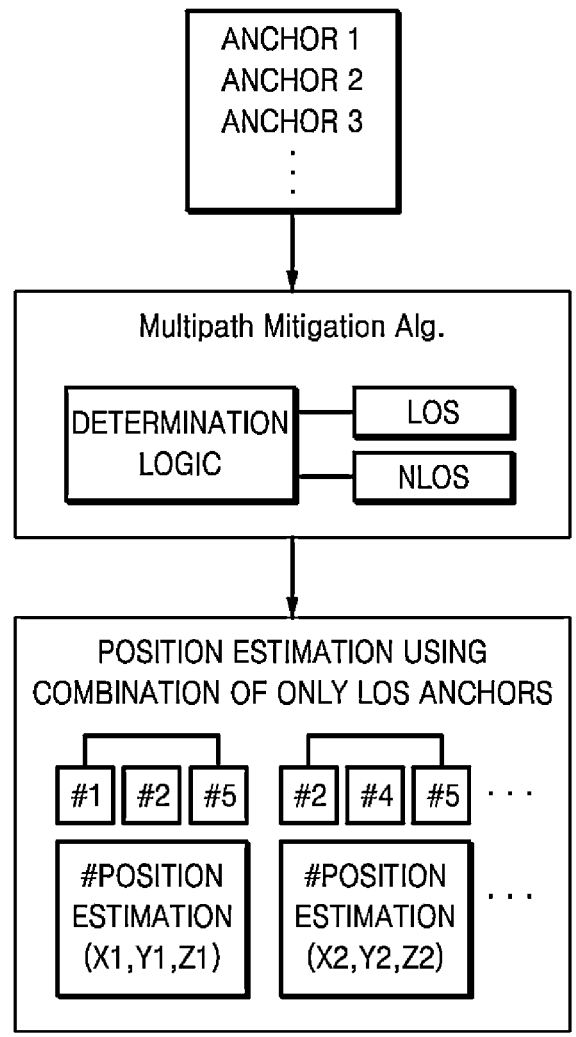
FIG. 2 is a diagram illustrating a process of estimating a position of an object using three line-of-sight (LOS) anchors according to an embodiment of the present disclosure.

FIG. 2 is a diagram illustrating a process of estimating a position of an object using three LOS anchors according to an embodiment of the present disclosure. The vehicle has a plurality of UWB anchors mounted therein. The UWB anchor may have the same meaning as an anchor. The LOS may mean a straight distance for electromagnetic waves to be able to travel in a straight line. The NLOS may mean a distance for the electromagnetic waves to be unable to travel in a straight line due to an obstacle or the like. When a distance between a tag and the anchor corresponds to the straight distance for the electromagnetic waves to be able to travel in a straight line, this anchor may correspond to an LOS anchor. When the distance between the tag and the anchor corresponds to the distance for the electromagnetic waves to be unable to travel in the straight line, the anchor may correspond to an NLOS anchor. The LOS anchors and the NLOS anchors may be distinguished. Three or more anchors are required to apply the trilateration technique. Forming UWB links between three anchors and an object has a higher link formation rate than forming UWB links between four anchors and an object. Forming a UWB link between an LOS anchor and an object has a higher link formation rate than forming a UWB link between an NLOS anchor and an object.

Referring to FIG. 2, a plurality of anchors may be mounted in a vehicle. The plurality of anchors may be classified into LOS anchors and NLOS anchors by using a multipath mitigation algorithm. The multipath mitigation algorithm may correspond to an algorithm for classifying anchors into LOS anchors and NLOS anchors using change in a received spectrum. Alternatively, the multipath mitigation algorithm may correspond to an algorithm for classifying anchors into LOS anchors and NLOS anchors using a histogram of errors. The multipath mitigation algorithm may be performed by a trained learning model of the control unit 120 of FIG. 1. The learning model can perform the multipath mitigation algorithm in consideration of a horizontal length, a tread width, or height of a nearby vehicle, a distance between nearby vehicles, a speed of nearby vehicles, building density, corner curvature, or the like. The position of the object can be estimated by combining three anchors among the classified LOS anchors and using the trilateration technique. Among the classified LOS anchors, the LOS anchor that has a high rate of formation of a link to the objects in consideration of the horizontal length, tread width, and height of the nearby vehicle, the distance between nearby vehicles, the speed of the nearby vehicles, the building density, the corner curvature, or the like may be assigned a weight. The weighted LOS anchor can become a reference anchor and form a link to the object.

The learning model may temporarily determine the anchor mounted in the vehicle to be a LOS anchor and then may finally determine the anchor to be a NLOS anchor in consideration of the horizontal length, tread width, and height of the nearby vehicle, the distance between nearby vehicles, the speed of the nearby vehicles, the building density, the corner curvature, or the like. The learning model may temporarily determine the anchor mounted in the vehicle to be an NLOS anchor and then may finally determine the anchor to be an LOS anchor in consideration of the horizontal length, tread width, and height of the nearby vehicle, the distance between nearby vehicles, the speed of the nearby vehicles, the building density, the corner curvature, or the like.

For example, five anchors including anchor 1, anchor 2, anchor 3, anchor 4, and anchor 5 are mounted in the vehicle. The five anchors may be classified into LOS anchors and NLOS anchors by using the multipath mitigation algorithm. Here, four anchors including anchor 1, anchor 2, anchor 4, and anchor 5 may be classified into LOS anchors, and anchor 3 may be classified into an NLOS anchor. The position of the object can be estimated by combining three anchors among the four LOS anchors and performing the trilateration technique. The trilateration technique may be performed with each of a combination of anchor 1, anchor 2, and anchor 4, a combination of anchor 1, anchor 2, and anchor 5, a combination of anchor 1, anchor 4, and anchor 5, or a combination of anchor 2, anchor 4, and anchor 5. The position of the object may be estimated according to each combination. An optimal anchor combination having a highest link formation rate and accuracy of the position may be selected using an error minimization objective function. A position of the object estimated by performing the trilateration technique with this optimal anchor combination can be finally used.

Figure 3:
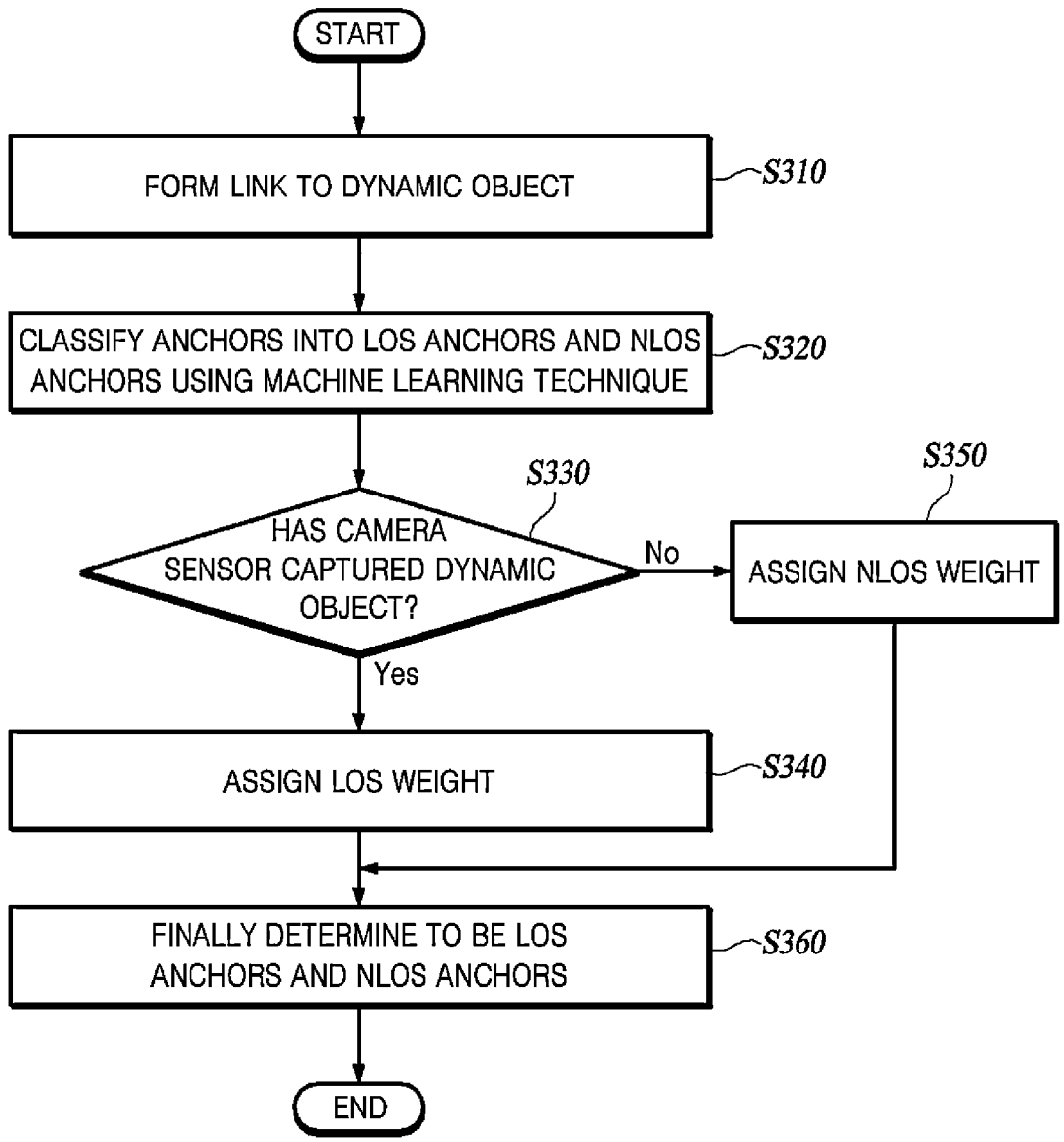
FIG. 3 is a diagram illustrating a process of classifying anchors into LOS anchors and non-line-of-sight (NLOS) anchors using a camera sensor according to an embodiment of the present disclosure.

FIG. 3 is a diagram illustrating a process of classifying anchors into LOS anchors and NLOS anchors using a camera sensor according to an embodiment of the present disclosure.

Referring to FIG. 3, one or more anchors mounted in a vehicle may form a UWB link to a dynamic object (S310). One or more anchors mounted in a vehicle may be temporarily determined to be LOS anchors and NLOS anchors using a machine learning technique (S320). The anchors may be temporarily determined to be the LOS anchor and the NLOS anchor using a deep learning model, a support vector machine model, or a convolution neural network (CNN) model. A determination may be made as to whether a camera sensor mounted in the vehicle has captured the dynamic object (S330). Not only camera sensors, but also various on-board sensors for vehicles, such as a radar or a lidar, may be used. The camera sensors can monitor surroundings of the vehicle based on vision. The camera sensor may determine in real time whether a dynamic object is present around the vehicle. When the camera sensor captures the dynamic object (S330—YES), a LOS weight may be assigned to the temporarily determined LOS anchor or NLOS anchor (S340). When the camera sensor does not capture the dynamic object (S330—NO), an NLOS weight may be assigned to the temporarily determined LOS anchor or NLOS anchor (S350). The one or more anchors mounted in the vehicle may be finally determined to be the LOS anchors and the NLOS anchors by using the LOS weight or the NLOS weight (S360).

Even when the one or more anchors are temporarily determined to be the LOS anchors, the NLOS weight may be applied and the anchors may finally be determined to be the NLOS anchors. Even when the one or more anchors are temporarily determined to be the LOS anchor and the NLOS weight is applied, the one or more anchors may be finally determined to be the LOS anchors. Even when the one or more anchors are temporarily determined to be the NLOS anchors, the LOS weight may be applied and the anchors may be finally determined to be the LOS anchors. Even when the one or more anchors are temporarily determined to be the NLOS anchors and the LOS weight is applied, the one or more anchors may be finally determined to be the NLOS anchors.

Figure 4:
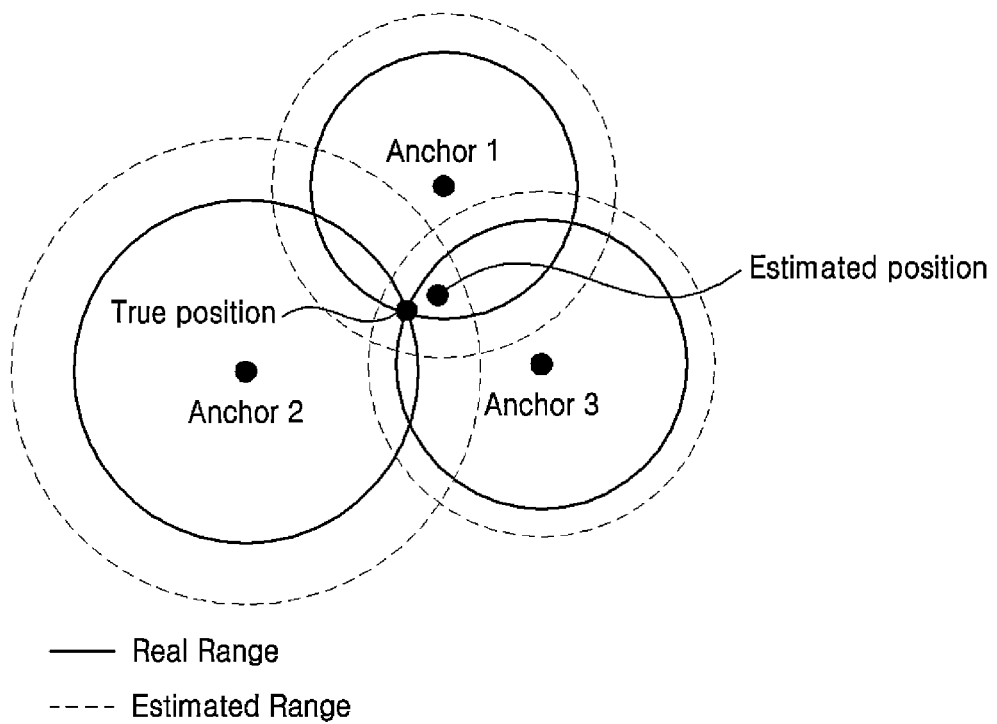
FIG. 4 is a diagram illustrating a method of estimating a position of an object by applying a trilateration technique to three anchors according to an embodiment of the present disclosure.

FIG. 4 is a diagram illustrating a method of estimating the position of the object by applying the trilateration technique to three anchors according to an embodiment of the present disclosure. The trilateration technique corresponds to a method of obtaining a relative position of an object using triangular geometry. In the trilateration technique, the position of the object can be acquired by using distances between three reference points and the object. Three circles having the distance between each reference point and the object as a radius are formed. A point at which all three circles overlap corresponds to the position of the object.

Referring to FIG. 4, a circle having a distance between anchor 1 and the object as a radius, a circle having a distance between anchor 2 and the object as a radius, and a circle having a distance between anchor 3 and the object as a radius may be formed. A point at which all the three circles overlap may correspond to a true position of the object. Further, a circle having an estimated distance between anchor 1 and the object as a radius, a circle having an estimated distance between anchor 2 and the object as a radius, and a circle having an estimated distance between anchor 3 and the object as a radius may be formed. A center position of a portion in which all the three circles overlap may correspond to an estimated position of the object.

Figure 5:
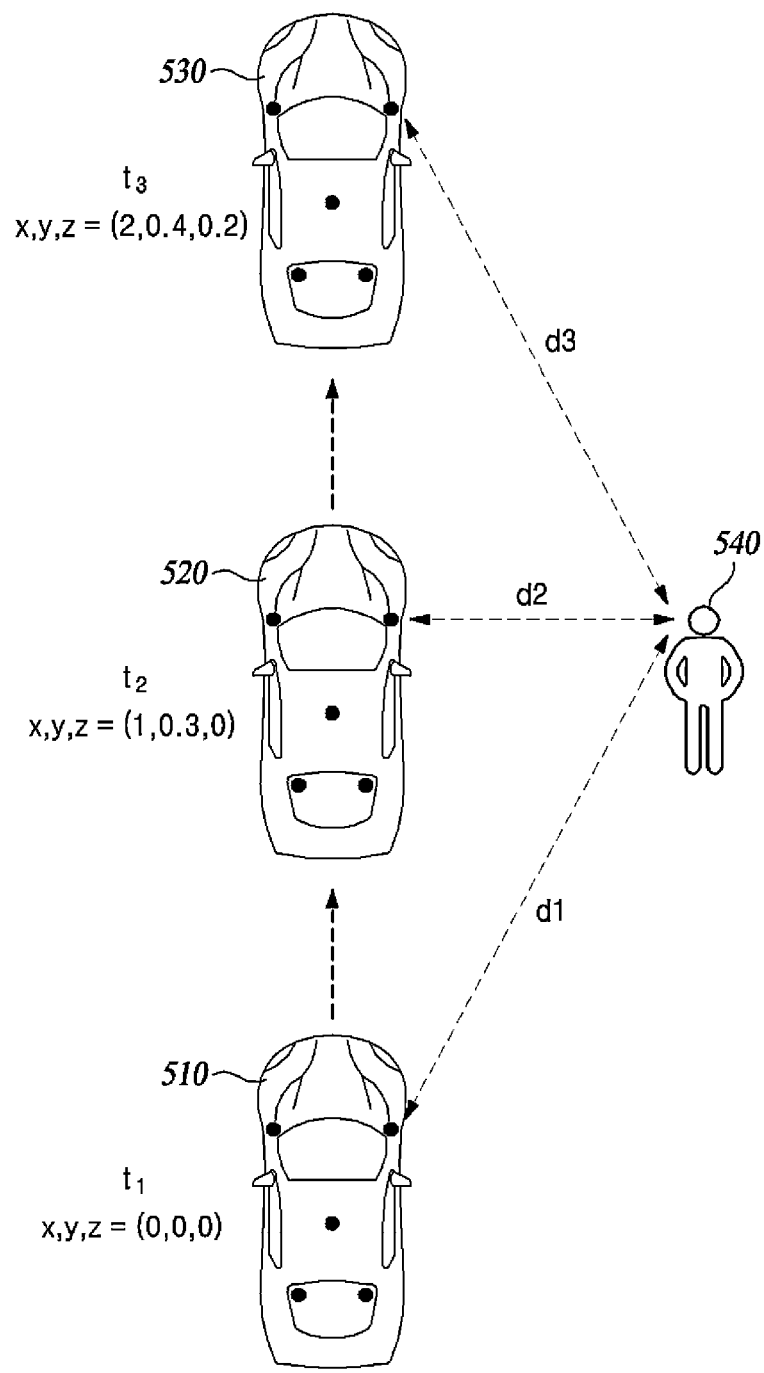
FIG. 5 is a diagram illustrating a distance between a position of a vehicle and a tag over time according to an embodiment of the present disclosure.

FIG. 5 is a diagram illustrating a distance between a position of a vehicle and a tag over time according to an embodiment of the present disclosure.

Referring to FIG. 5, a vehicle at a point in time $t_1$ (a "vehicle 510") may have five anchors mounted therein. Among the five anchors, one anchor on the right side of the front of the vehicle can be selected. Coordinates of the one selected anchor may correspond to (0, 0, 0). The one selected anchor may form a UWB link to a tag 540. An estimated distance d1 between the coordinates (0, 0, 0), which are the coordinates of one selected anchor, and the tag 540 may be calculated.

Coordinates of one anchor selected in the vehicle at a point in time $t_2$ (the "vehicle 520") may correspond to (1, 0.3, 0). (1, 0.3, 0), which are the coordinates of the one selected anchor, may be acquired using a value of a movement distance of the vehicle for a time $t_2-t_1$. The value of the movement distance of the vehicle for time $t_2-t_1$ can be calculated by using odometry, the number of vehicle wheel rotations, a camera deep learning model, dead reckoning, a vehicle speed and direction, or the like. The one selected anchor may form a UWB link to the tag 540. An estimated distance d2 between (1, 0.3, 0), which are the coordinates of the one selected anchor, and the tag 540 may be calculated.

Coordinates of one anchor selected in the vehicle at a point in time $t_3$ (the "vehicle 530") may correspond to (2, 0.4, 0.2). (2, 0.4, 0.2), which are the coordinates of the one selected anchor, may be acquired by using a value of a movement distance of the vehicle for time $t_3-t_2$. The value of the movement distance of the vehicle for the time $t_3-t_2$ may be calculated by using odometry, the number of vehicle wheel rotations, a camera deep learning model, dead reckoning, the speed and direction of the vehicle, or the like. The one selected anchor may form a UWB link to the tag 540. An estimated distance d3 between (2, 0.4, 0.2), which are the coordinates of the one selected anchor, and the tag 540 may be calculated.

Figure 6:
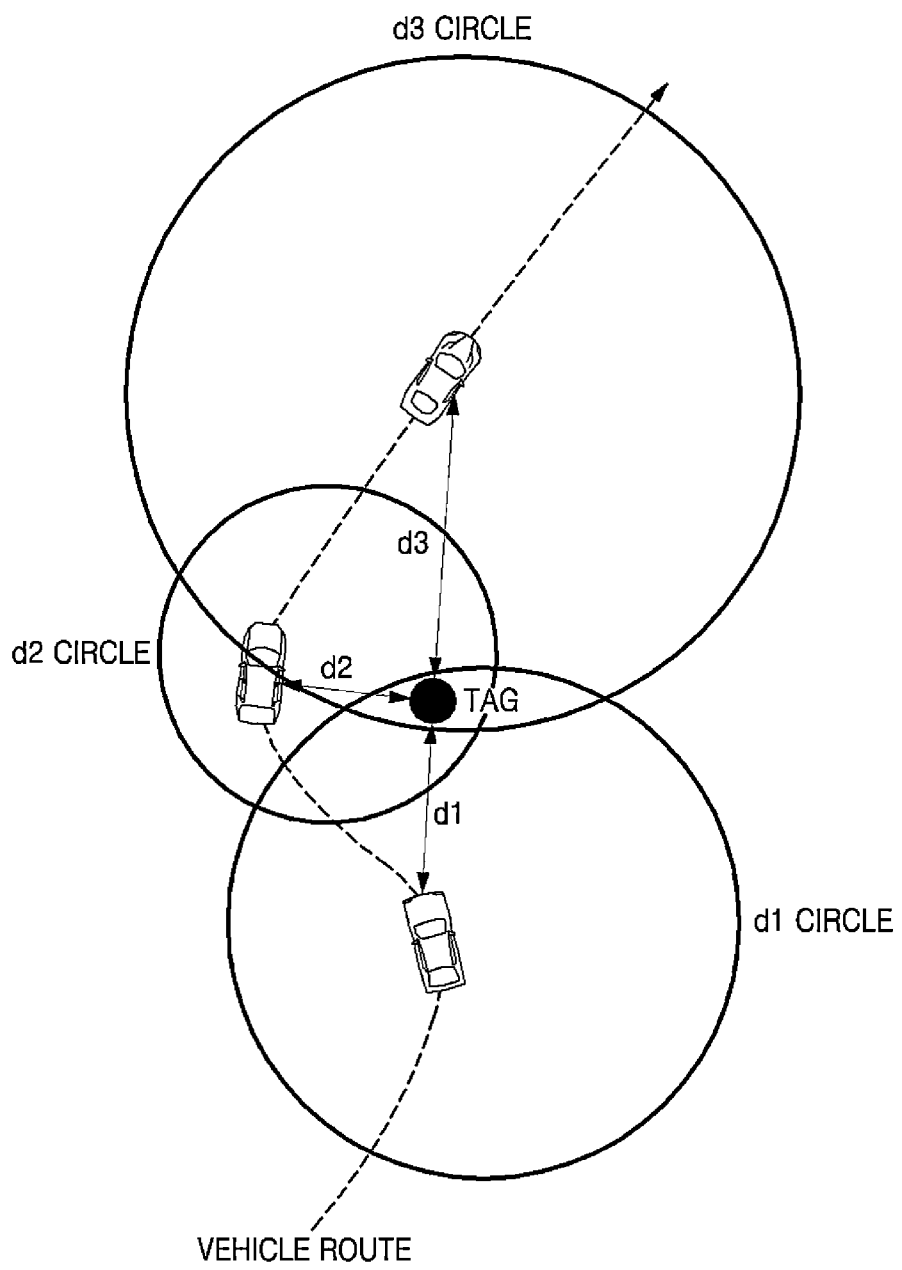
FIG. 6 is a diagram illustrating a process of estimating a position of a tag using the position of the vehicle over time according to an embodiment of the present disclosure.

FIG. 6 is a diagram illustrating a process of estimating a position of the tag using a position of the vehicle over time according to an embodiment of the present disclosure.

Referring to FIG. 6, a vehicle route may correspond to a route along which the vehicle moves for time $t_3-t_1$ in FIG. 5. The vehicle route may correspond to a movement route of the one anchor selected from among the five anchors mounted in the vehicle in FIG. 5. Three coordinates on the movement route of the vehicle can be selected. The three coordinates can be used in the trilateration technique. The three coordinates may be selected using a vehicle speed, a direction and angle of the vehicle, an absolute position at a point in time $t_1$, odometry, the number of vehicle wheel rotations, a camera deep learning model, and the like. Estimated distances between the respective coordinates and the tag may correspond to d1, d2, and d3. A d1 circle, a d2 circle, and a d3 circle may be generated with d1, d2, and d3 as radii. A center position of a portion in which the d1 circle, the d2 circle, and the d3 circle overlap may be estimated as the position of the tag. Each coordinate on the movement route of the vehicle may be stored in a memory of the vehicle. An estimated distance between each coordinate and the tag may also be stored in the memory of the vehicle. An algorithm for estimating the position of the tag through this process may correspond to a smart anchor-based position estimation (SAP; Smart Anchor Positioning) algorithm.

The number of tags that can be recognized by performing the trilateration technique using one anchor mounted in the vehicle may be larger than the number of tags that can be recognized by performing the trilateration technique using three anchors mounted in the vehicle. When the trilateration technique is performed using one anchor mounted in a vehicle, an object detection rate and a link formation rate can be improved.

Figure 7A:
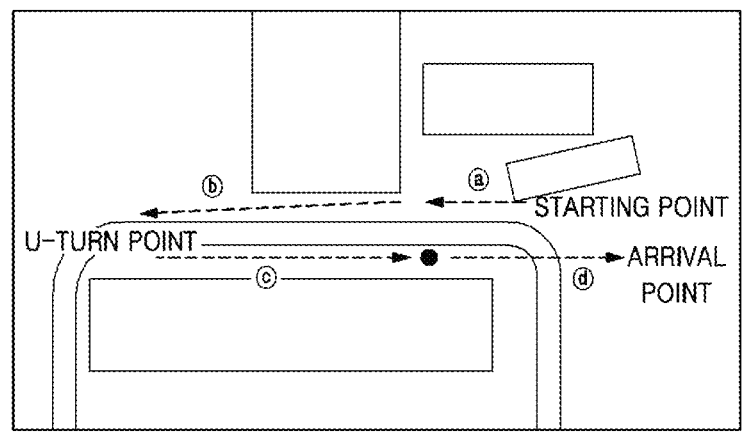
FIGS. 7A and 7B are diagrams illustrating positions of tags and anchors when a vehicle having a plurality of anchors mounted therein moves according to an embodiment of the present disclosure.
Figure 7B:
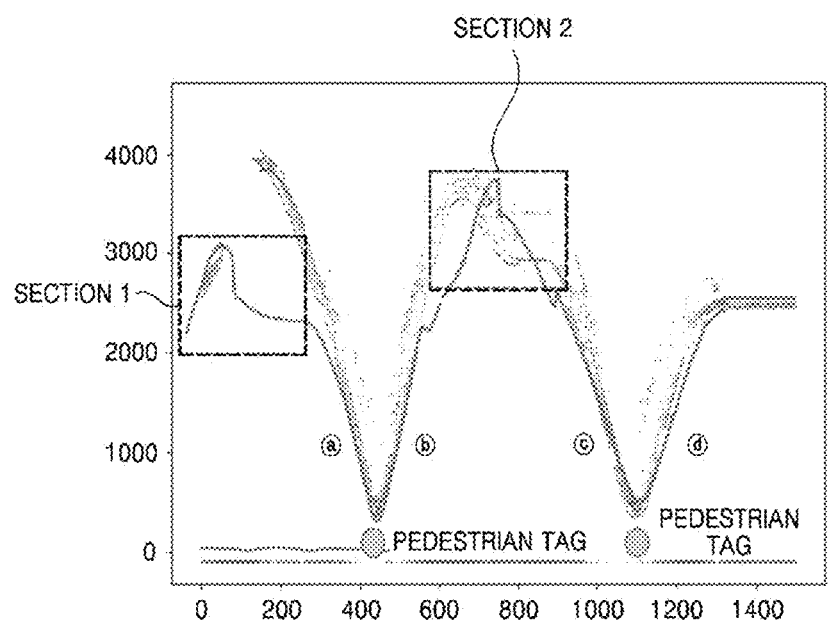

FIGS. 7A and 7B are diagrams illustrating positions of tags and anchors when a vehicle having a plurality of anchors mounted therein moves according to an embodiment of the present disclosure.

Referring to FIG. 7A, the vehicle having the five anchors mounted therein on a map may pass a point a, a tag, and a point b from a starting point, make a U-turn, pass a point c, a tag, and a point d, and move to an arrival point. Positions of the five anchors may be changed according to the movement route of the vehicle.

Referring to FIG. 7B, as the vehicle moves in FIG. 7A, the positions of five anchors mounted in the vehicle may be expressed in coordinates. Section 1 may be unstable because absolute position coordinates of the anchor are not initially set. As the vehicle passes a point a and approaches a pedestrian tag, the position of the anchor may also approach the pedestrian tag. The vehicle may pass a point b and enter section 2. Section 2 may be unstable as the vehicle makes a U-turn. The vehicle may pass section 2, pass a point c, and approach a pedestrian tag. Accordingly, the position of the anchor may also approach the pedestrian tag. As the vehicle passes a point d and stops, the position of the anchor may also not change.

Figure 8:
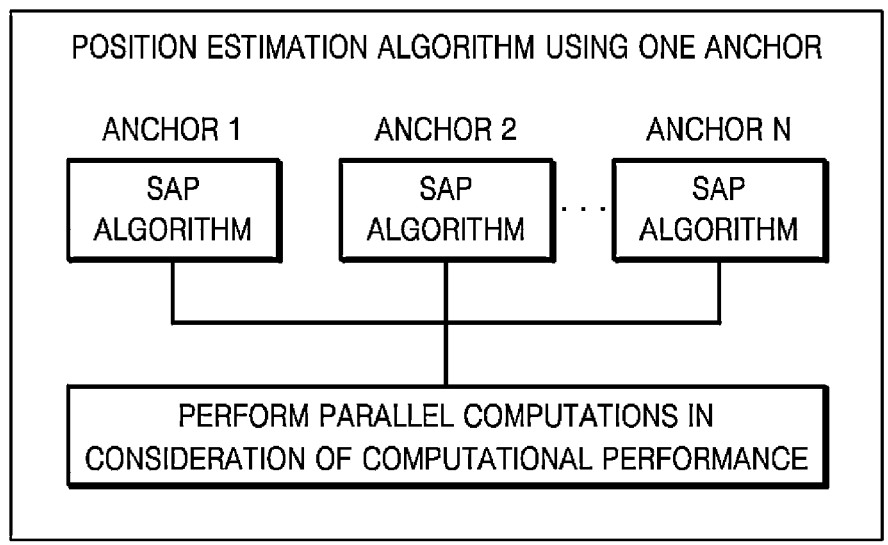
FIG. 8 is a diagram illustrating a method of applying a smart anchor-based position estimation algorithm to each of a plurality of anchors according to an embodiment of the present disclosure.

FIG. 8 is a diagram illustrating a method of applying a smart anchor-based position estimation algorithm to each of a plurality of anchors according to an embodiment of the present disclosure.

Referring to FIG. 8, an n number of anchors may be mounted in the vehicle. The smart anchor-based position estimation algorithm may be performed using each of the n anchors. The smart anchor-based position estimation algorithms using each of the n anchors can be performed in parallel in consideration of computational performance. An optimal anchor having a highest link formation rate and accuracy of the position may be selected using an error minimization objective function. The position of the object estimated by applying the trilateration technique to this optimal anchor can be finally used.

Figure 9:
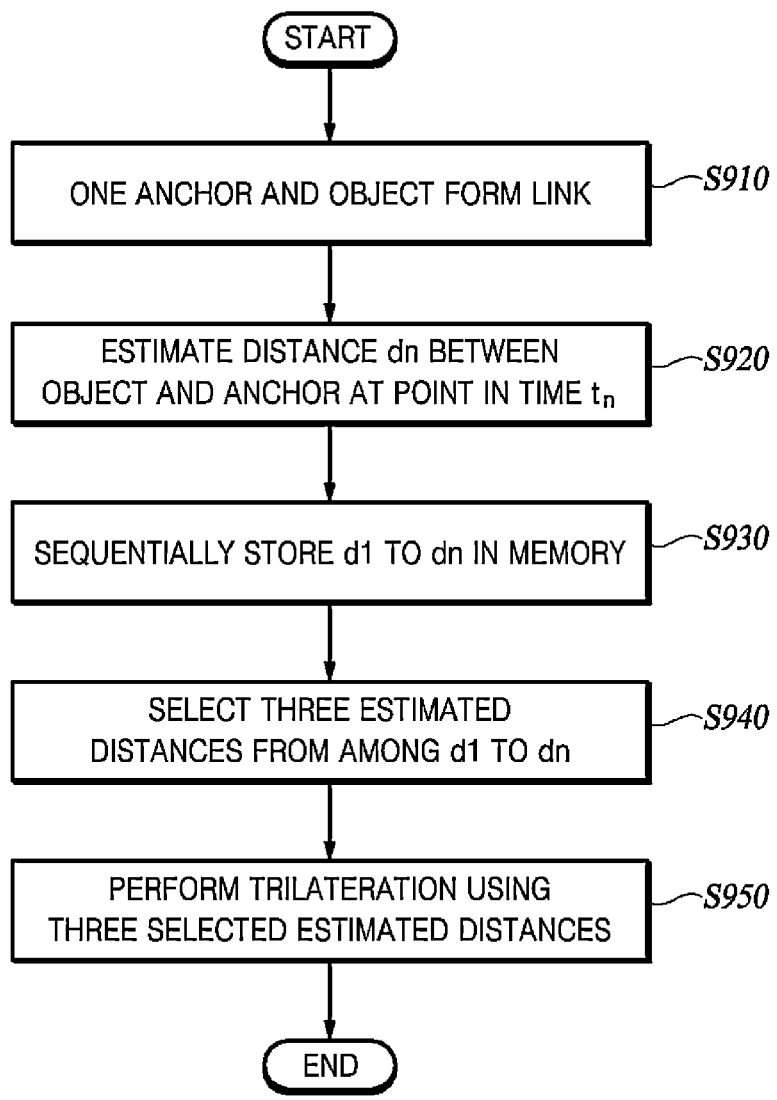
FIG. 9 is a diagram illustrating a process of estimating a position of a smart anchor-based object according to an embodiment of the present disclosure.

FIG. 9 is a diagram illustrating a process of estimating the position of the object using a smart anchor-based algorithm according to an embodiment of the present disclosure.

Referring to FIG. 9, one or more anchors may be mounted in a vehicle. One anchor and an object may form a link (S910). A distance dn between the object and the anchor at a point in time $t_n$, may be estimated (S920). The distance dn between the object and the anchor may be estimated using coordinates of the anchor and coordinates of the tag at each point in time. The coordinates of the anchor at each point in time may be calculated using a movement distance of the vehicle per hour. The movement distance of the vehicle per hour may be calculated using a camera deep learning model, a speed of the vehicle, a wheel speed, odometry, dead reckoning, or the like. The estimated distances d1 to dn between the object and the anchor may be sequentially stored in the memory (S930). The coordinates of the anchor at each point in time may also be stored in the memory. Three estimated distances may be selected from among d1 to dn (S940). Three coordinates may be selected from a movement route of the vehicle. Trilateration may be performed using the three estimated distances and the three coordinates that have been selected (S950). Three circles with the three estimated distances as radii may be formed. A center position of a portion in which the three circles overlap may be estimated as the position of the object.

Figure 10:
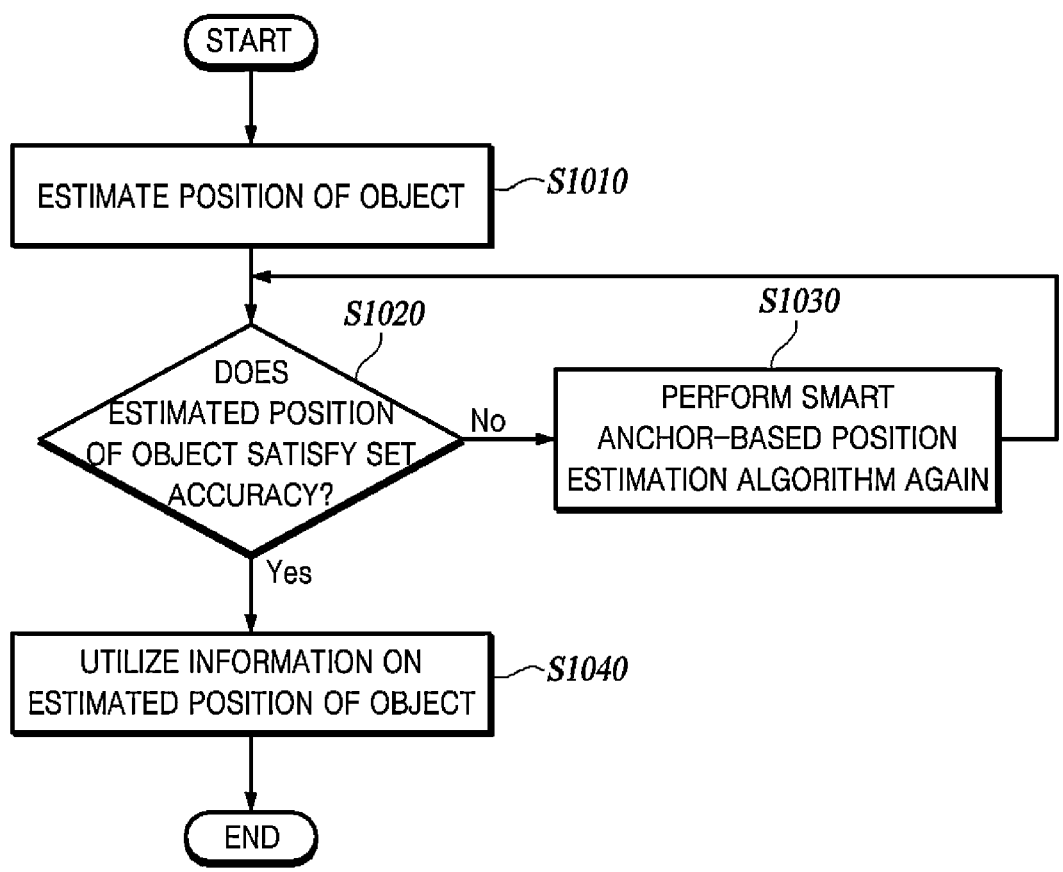
FIG. 10 is a diagram illustrating a process of utilizing an estimated position of an object according to the accuracy of the estimated position of the object according to an embodiment of the present disclosure.

FIG. 10 is a diagram illustrating a process of utilizing the estimated position of the object according to the accuracy of the estimated position of the object according to an embodiment of the present disclosure.

Referring to FIG. 10, the position of the object may be estimated using the smart anchor-based algorithm of FIG. 8 (S1010). A determination may be made as to whether the estimated position of the object satisfies set accuracy (S1020). The set accuracy may correspond to an arbitrary value. The estimated position of the object may be compared with a true position of the object. When the set accuracy is not satisfied (S1020—NO), the smart anchor-based position estimation algorithm may be performed again (S1030). Alternatively, a determination may be made as to whether a position of the object estimated by performing a smart anchor-based position estimation algorithm using another anchor satisfies the set accuracy. A determination may be made as to whether the position of the object estimated by performing the smart anchor-based position estimation algorithm again satisfies the set accuracy. When the set accuracy is satisfied (S1020—YES), information on the estimated position of the object may be utilized (S1040). The information on the estimated position of the object may be used as input data of various applications.

Figure 11:
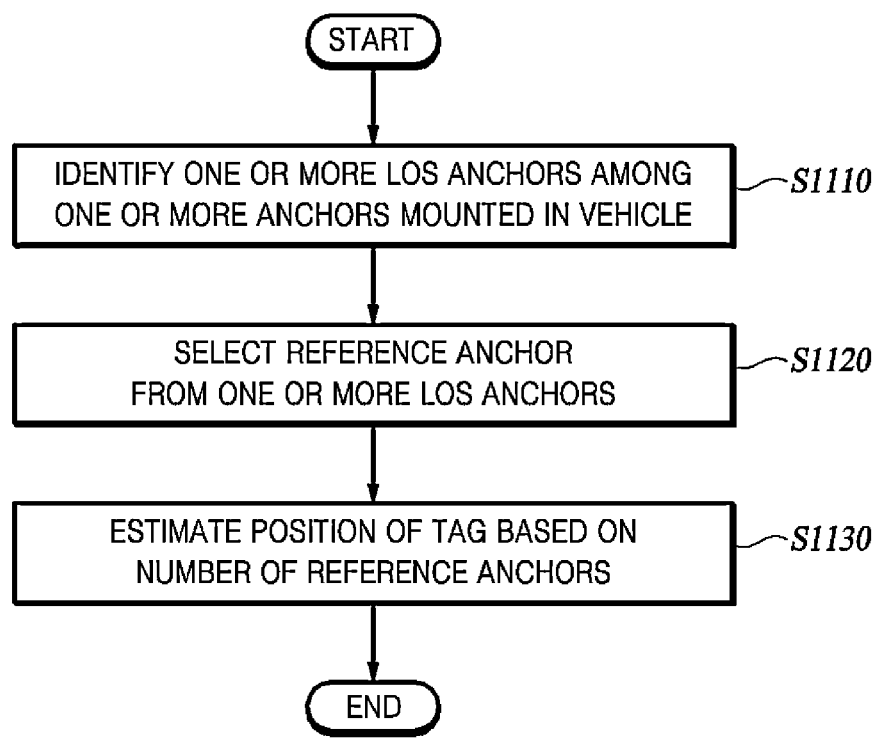
FIG. 11 is a diagram illustrating a position estimation method according to an embodiment of the present disclosure.

FIG. 11 is a diagram illustrating a position estimation method according to an embodiment of the present disclosure.

Referring to FIG. 11, the position estimation apparatus may identify one or more LOS anchors among the one or more anchors mounted in the vehicle (S1110). The position estimation apparatus may select reference anchors from the one or more LOS anchors (S1120). The position estimation apparatus may estimate the position of the tag based on the number of reference anchors (S1130). The position estimation apparatus may transfer information on the position of the tag to the application. The reference anchor may be selected based on the rate of formation of a UWB link to the tag and the accuracy of the estimated tag position.

When the number of reference anchors is three (3), the position of the tag may be estimated using the three reference anchors and the trilateration technique. When the number of reference anchors is one (1), three coordinates may be selected on the movement route of the vehicle. The position of the tag may be estimated using three coordinates and an estimated distance between the reference anchor and the tag. The three coordinates may be determined based on a movement distance of the vehicle. The movement distance of the vehicle may be calculated using at least one of odometry, a vehicle speed, the number of vehicle wheel rotations, a camera deep learning model, or dead reckoning. The one reference anchor may be selected by applying the smart anchor-based position estimation algorithm to the one or more LOS anchors in parallel. The one reference anchor may correspond to an anchor having the highest rate of formation of the UWB link to the tag and the highest position accuracy of the tag among the one or more LOS anchors. The one or more LOS anchors may be identified based on a deep learning model or a support vector machine model. The one or more LOS anchors may be identified based on change in a received spectrum or an error histogram.

The one or more LOS anchors are changed to NLOS anchors or maintained as LOS anchors based on at least one of a tread width, length, height, or speed of a nearby vehicle, a distance between nearby vehicles, building density, or a corner curvature. The reference anchor may be determined based on at least one of a tread width, length, height, or speed of a nearby vehicle, a distance between nearby vehicles, building density, or a corner curvature. The step of identifying the one or more LOS anchors may comprise a step of temporarily determining whether the one or more anchors mounted in the vehicle are LOS anchors or NLOS anchors using a deep learning model or a support vector machine model. The step of identifying the one or more LOS anchors may also comprise a step of determining whether the camera sensor has captured an object. The step of identifying the one or more LOS anchors may also comprise a step of assigning an LOS weight when a determination is made that the camera sensor has captured the object and assigning an NLOS weight when a determination is made that the camera sensor has not captured the object. The step of identifying the one or more LOS anchors may also comprise a step of finally determining whether the one or more anchors mounted in the vehicle are the LOS anchors or the NLOS anchors using the LOS weight or the NLOS weight. Various on-board sensors for a vehicle, such as a radar or lidar, as well as the camera sensors may be used.

According to the present disclosure, it is possible to provide a method and an apparatus for estimating a position of an object using three anchors.

Furthermore, according to the present disclosure, it is possible to provide a method and an apparatus for estimating a position of an object using one anchor.

Furthermore, according to the present disclosure, it is possible to provide a method and an apparatus for improving a link formation rate using one anchor.

Furthermore, according to the present disclosure, it is possible to provide a method and an apparatus for classifying anchors into LOS (line of sight) anchors and NLOS (none line of sight) anchors.

Effects that can be obtained in the present disclosure are not limited to the above-described effects. Other effects not described can be clearly understood by those having ordinary skill in the art to which the present disclosure belongs from the following description.

The respective components of the device or method according to the present disclosure may be implemented in hardware or software, or a combination of hardware and software. Further, a function of each component may be implemented in software and a microprocessor may be implemented to execute the function of the software corresponding to each component.

Various implementation examples of the systems and techniques described herein may be realized by a digital electronic circuit, an integrated circuit, an FPGA (field programmable gate array), an ASIC (application specific integrated circuit), computer hardware, firmware, software, and/or a combination thereof. These various implementation examples may be implemented by one or more computer programs executable on a programmable system. The programmable system includes at least one programmable processor (which may be a special purpose processor or may be a general purpose processor) connected to receive data and instructions from a storage system, at least one input device, and at least one output device and transfer data and instructions to these. The computer programs (also known as programs, software, software applications, or code) include instructions for the programmable processor and are stored in a "computer-readable recording medium".

The computer-readable recording medium includes any type of recording devices in which data that can be read by a computer system is stored. The computer-readable recording medium may be a non-volatile or non-transitory medium, such as a ROM, a CD-ROM, a magnetic tape, a floppy disk, a memory card, a hard disk, a magneto-optical disc, and a storage device. The computer-readable recording medium may further include a transitory medium such as a data transmission medium. Further, the computer-readable recording medium may be distributed in network-connected computer systems, and computer-readable code may be stored and executed in a distributed manner.

Although operations are illustrated in the flowcharts/timing charts in this specification as being sequentially performed, this is merely a description of the technical idea of one embodiment of the present disclosure. In other words, those having ordinary skill in the art to which the present disclosure belongs may appreciate that various modifications and changes can be made without departing from essential features of the present disclosure. In other words, the sequence illustrated in the flowcharts/timing charts can be changed and one or more operations of the operations can be performed in parallel. Thus, flowcharts/timing charts are not limited to the temporal order.

Although embodiments of the present disclosure have been described for illustrative purposes, those having ordinary skill in the art should appreciate that various modifications, additions, and substitutions are possible, without departing from the technical idea and scope of the present disclosure. Therefore, embodiments of the present disclosure have been described for the sake of brevity and clarity. The scope of the technical idea of the present embodiments is not limited by the illustrations. Accordingly, one of ordinary skill should understand that the scope of the present disclosure is not to be limited by the above explicitly described embodiments but by the claims and equivalents of the claims.

What is claimed is:

1. A position estimation method performed by a position estimation apparatus, the position estimation method comprising:
    identifying one or more line-of-sight (LOS) anchors that are within line of sight of a tag from among one or more anchors mounted in a vehicle;
    selecting one or more reference anchors from among the one or more LOS anchors; and
    estimating a position of the tag based on a number of the one or more reference anchors and ultra-wideband (UWB) links formed between the one or more reference anchors and the tag,
    wherein the one or more reference anchors are selected based on a rate of formation of a UWB link to the tag and a predicted accuracy of the estimated position of the tag based on combinations of anchors,
    wherein the estimating of the position of the tag based on the number of the one or more reference anchors comprises:
        determining that the number of the one or more reference anchors is one;
        selecting three coordinates on a movement route of the vehicle; and
        estimating the position of the tag using the three coordinates and an estimated distance between the one reference anchor and the tag,
    wherein the one reference anchor is selected by applying a smart anchor-based position estimation algorithm to the one or more LOS anchors in parallel, and is an anchor having a highest rate of formation of a UWB link to the tag and a highest accuracy of the position of the tag among the one or more LOS anchors.

2. The method of claim 1, wherein the estimating of the position of the tag based on the number of the one or more reference anchors comprises estimating the position of the tag using three reference anchors and a trilateration technique when the number of the one or more reference anchors is three.

3. The method of claim 1, wherein the three coordinates are determined based on a movement distance of the vehicle, and wherein the movement distance of the vehicle is calculated using at least one of odometry, a speed of the vehicle, a number of vehicle wheel rotations, a camera deep learning model, or dead reckoning.

4. The method of claim 1, further comprising:
    transferring information on the position of the tag to an application.

5. The method of claim 1, wherein the one or more LOS anchors are identified based on a deep learning model or a support vector machine model.

6. The method of claim 1, wherein the one or more LOS anchors are identified based on change in a received spectrum associated with each anchor or an error histogram of ranging errors between each anchor and the tag.

7. The method of claim 5, wherein the one or more LOS anchors are changed to non-line-of-sight (NLOS) anchors or maintained as LOS anchors based on at least one of a tread width, length, height, or speed of a vehicle located near the vehicle in which the one or more anchors are mounted, a distance between nearby vehicles, a building density around the vehicle, or a corner curvature of a road, and wherein the one reference anchor is determined based on at least one of the tread width, length, height, or speed of a vehicle located near the vehicle in which the one or more anchors are mounted, the distance between nearby vehicles, the building density, or the corner curvature.

8. The method of claim 1, wherein the identifying of the one or more LOS anchors comprises:
    determining whether the one or more anchors mounted in the vehicle are LOS anchors or NLOS anchors using a deep learning model or a support vector machine model temporarily;
    determining whether a camera sensor mounted in the vehicle has captured an object on which the tag is located;
    assigning a LOS weight when a determination is made that the camera sensor has captured the object with the tag, and assigning a NLOS weight when a determination is made that the camera sensor has not captured the object with the tag; and
    determining whether the one or more anchors mounted in the vehicle are the LOS anchors or the NLOS anchors using the LOS weight or the NLOS weight finally.

9. A position estimation apparatus comprising:
a memory; and a plurality of processors, wherein at least one processor of the plurality of processors is configured to:
identify one or more line-of-sight (LOS) anchors from among one or more anchors mounted in a vehicle;
select one or more reference anchors that are within line of sight of a tag from among the one or more LOS anchors; and
estimate a position of the tag based on a number of the one or more reference anchors and ultra-wideband (UWB) links formed between the one or more reference anchors and the tag,
wherein the one or more reference anchors are selected based on a rate of formation of a UWB link to the tag and a predicted accuracy of the estimated position of the tag based on combinations of anchors,
wherein the at least one processor is further configured to:
select three coordinates on a movement route of the vehicle when the number of the one or more reference anchors is 1; and
estimate the position of the tag using the three coordinates and an estimated distance between the one reference anchor and the tag,
wherein the one reference anchor is selected by applying a smart anchor-based position estimation algorithm to the one or more LOS anchors in parallel, and is an anchor having a highest rate of formation of a UWB link to the tag and a highest accuracy of the position of the tag among the one or more LOS anchors.

10. The apparatus of claim 9, wherein the at least one processor estimates the position of the tag using three reference anchors and a trilateration technique when the number of the one or more reference anchors is three.

11. The apparatus of claim 9, wherein the three coordinates are determined based on a movement distance of the vehicle, and wherein the movement distance of the vehicle is calculated using at least one of odometry, a speed of the vehicle, a number of vehicle wheel rotations, a camera deep learning model, or dead reckoning.

12. The apparatus of claim 9, wherein the at least one processor is configured to transfer information on the position of the tag to an application.

13. The apparatus of claim 9, wherein the one or more LOS anchors are identified based on a deep learning model or a support vector machine model.

14. The apparatus of claim 9, wherein the one or more LOS anchors are identified based on change in a received spectrum associated with each anchor or an error histogram of ranging errors between each anchor and the tag.

15. The apparatus of claim 13, wherein the one or more LOS anchors are changed to non-line-of-sight (NLOS) anchors or maintained as LOS anchors based on at least one of a tread width, length, height, or speed of a vehicle located near the vehicle in which the one or more anchors are mounted, a distance between nearby vehicles, a building density around the vehicle, or a corner curvature of a road, and wherein the one reference anchor is determined based on at least one of the tread width, length, height, or speed of a vehicle located near the vehicle in which the one or more anchors are mounted, the distance between nearby vehicles, the building density, or the corner curvature.

16. The apparatus of claim 9, wherein the at least one processor is configured to:
determine whether the one or more anchors mounted in the vehicle are LOS anchors or NLOS anchors using a deep learning model or a support vector machine model temporarily;
determine whether a camera sensor mounted in the vehicle has captured an object on which the tag is located;
assign a LOS weight when a determination is made that the camera sensor has captured the object with the tag, and assign a NLOS weight when a determination is made that the camera sensor has not captured the object with the tag; and
determine whether the one or more anchors mounted in the vehicle are the LOS anchors or the NLOS anchors using the LOS weight or the NLOS weight finally.

* * * * *